United States Patent [19]
Crossdale et al.

[11] Patent Number: 5,908,143
[45] Date of Patent: Jun. 1, 1999

[54] SINGLE SHOT LIQUID DISPENSER

[75] Inventors: Garry William Crossdale, Ripley; Ken John Herbert Bird, Beeston; Brian Peter Onufryk, Spondon; David Grant Barnett, Seaford, all of United Kingdom

[73] Assignee: Diversey Lever, Inc., Plymouth, Mich.

[21] Appl. No.: 08/768,202

[22] Filed: Dec. 17, 1996

[30] Foreign Application Priority Data

Dec. 22, 1995 [GB] United Kingdom .................... 9526391

[51] Int. Cl.⁶ .............................. B67D 5/08; B65D 88/54; B65D 47/00
[52] U.S. Cl. ......................... 222/52; 222/181.3; 222/340; 222/383.1; 222/477
[58] Field of Search .................................. 222/383.1, 52, 222/339, 477, 340, 181.3, 181.2

[56] References Cited

U.S. PATENT DOCUMENTS

| | | |
|---|---|---|
| 1,401,642 | 12/1921 | Ravaz et al. . |
| 3,460,723 | 8/1969 | Young ..................................... 222/477 |
| 4,360,130 | 11/1982 | Nishimura et al. ................... 222/181.2 |
| 4,784,300 | 11/1988 | Lees ........................................ 222/477 |
| 5,086,950 | 2/1992 | Crossdale et al. . |
| 5,445,288 | 8/1995 | Banks .................................. 222/181.2 |
| 5,456,297 | 10/1995 | Crossdale et al. . |
| 5,682,930 | 11/1997 | Crossdale . |

FOREIGN PATENT DOCUMENTS

| | | |
|---|---|---|
| 023 975 | 2/1981 | European Pat. Off. . |
| 0369722 | 8/1993 | European Pat. Off. . |
| 1100417 | 1/1968 | United Kingdom ................... 222/310 |
| 1 564 910 | 11/1977 | United Kingdom . |

OTHER PUBLICATIONS

International Search Report dated Feb. 28, 1997.

*Primary Examiner*—Andres Kashnikow
*Assistant Examiner*—Keats Quinalty
*Attorney, Agent, or Firm*—Milton L. Honig

[57] ABSTRACT

A manually operated dispenser for dispensing single shots of liquid with a built-in extended delay between each manually dispensed shot is described. The dispenser contains a manually operated pump for withdrawing a single shot of liquid from the reservoir of liquid, an outlet through which the pump dispenses the single shot and a reciprocal piston and cylinder assembly on the pump. The piston is ready to dispense the single shot of liquid into the outlet when in a retracted position. A plunger which is biased to move away from the piston manually moves the piston to dispense the shot. A detent is provided for locking the plunger in an outward position. A piston spring is loaded in a manner such that when the piston is moved to a retracted position the detent is disengaged and the relative movement of the piston from the extended position to the retracted position defines a built in extended delay between dispensed shots of liquid.

6 Claims, 5 Drawing Sheets

SINGLE SHOT LIQUID DISPENSER

FIELD OF THE INVENTION

The present invention relates to a liquid dispenser, in particular a dispenser for dispensing individual "shots" or "doses" of a liquid.

BACKGROUND OF THE INVENTION

Dispensers for dispensing individual shots of a liquid are very well known, for example in both private and public bathrooms soap dispensers are commonplace. Similar sorts of dispensers are also known for dispensing industrial detergents and the like, with which a dose of the relevant chemical can be dispensed directly into a washing-up bowl, into a small container such as a cup for transferal to a bucket, or into a bottle slotted into the bottom of the dispenser; in all cases, the intention is that the chemical be dosed in a concentrated form and then diluted with water.

The individual doses of the liquid are drawn from a reservoir (for example a bottle) in the dispenser by means of a cylinder and piston arrangement. When the piston is depressed by the user, the shot is dispensed and the next shot is drawn from the reservoir. A certain amount of time is needed for the subsequent shot to be drawn, this time in part depending on the viscosity of the liquid. Before the subsequent shot is ready, there is the risk that the user could depress the piston again but only receive part of a shot. This means that the correct concentration of liquid would not be obtained, since the same amount of water as for a full shot would tend to be used.

Moreover, in the event that aggressive detergents or sanitizing liquids are being dispensed, there is the problem that users might use excessive concentrations, by putting more than the correct number of shots into the container where the liquid is diluted. In the usual case, of course, only one shot will be used, the size of the shot being adjustable by means of a suitable adjustment to the dispenser. The problem of over-dosing can be reduced if the dispenser is not ready to dispense a further shot for a significant amount of time. It has been attempted to delay the time before which the dispenser can be used again by extending the normal recharge time of the piston arrangement, for example by including a slow release valve in the line between the reservoir of liquid and the discharge cylinder. However, this arrangement still has the disadvantage that a fraction of a shot will be able to be dispensed after the relevant fraction of the delay time has elapsed.

SUMMARY OF THE INVENTION

The object of an aspect of the invention is to provide a dispenser which has a more careful control of the time between which shots can be dispensed.

According to an aspect of the invention provides a dispenser comprising a reservoir liquid, a piston assembly for drawing an amount of liquid from the reservoir and discharging that amount, and an outlet through which the said amount of liquid is dispensed, wherein the piston assembly comprises a piston member and a plunger member which can be manually depressed and which acts upon the piston member, both the piston member and the plunger member being moveable between an outer position in which the dispenser is ready to dispense and an inner position in which the liquid is dispensed, wherein the plunger member is moveable back to the ready position independently of the piston member and is lockable in the ready position so that it cannot be depressed, and wherein movement of the piston member back to its ready position automatically unlocks the plunger member.

According to an aspect of the invention, a manually operated dispenser for dispensing single shots of liquid with a built-in extended delay between each manually dispensed shot comprises:

i) a reservoir of liquid to be dispensed;
ii) a manually operated pump for withdrawing a single shot of liquid from the reservoir of liquid;
iii) an outlet through which the pump dispenses a single shot of liquid;
iv) the pump having a reciprocal piston and cylinder assembly for relative movement, where the piston in a retracted position is ready to dispense a single shot of liquid into the outlet;
v) a plunger for manually positioning the piston in an extended position to dispense a single shot of liquid from the cylinder and into the outlet, the plunger being moveable away from the piston and cylinder assembly to its outward ready-to-dispense position and means for biasing the plunger to the outward position;
vi) means for locking the plunger in the outward position;
vii) means for biasing the piston to the retracted position relative to the cylinder whereby relative movement of the piston to the retracted position disengages the locking means, the relative movement of the piston from said extended position to the retracted position defining the built-in extended delay between dispensed shots of liquid.

In a preferred embodiment, at least one catch is provided in the dispenser which engages the plunger member in its ready position but which is disengaged by the movement of the piston member back to its ready position. The catches may be provided by pivotable rocking arms which are pivoted by movement of the piston member.

For the avoidance of any doubt, it is confirmed that the moveable piston member can either be a piston which moves inside a fixed piston cylinder in the dispenser or can be a piston cylinder which moves over a fixed piston in the dispenser.

BRIEF DESCRIPTION OF THE DRAWINGS

A preferred embodiment of the invention is described in more detail below, by example only, with reference to the accompanying drawings, wherein.

DETAILED DESCRIPTION OF THE PREFERRED EMBODIMENTS

Figure 1:
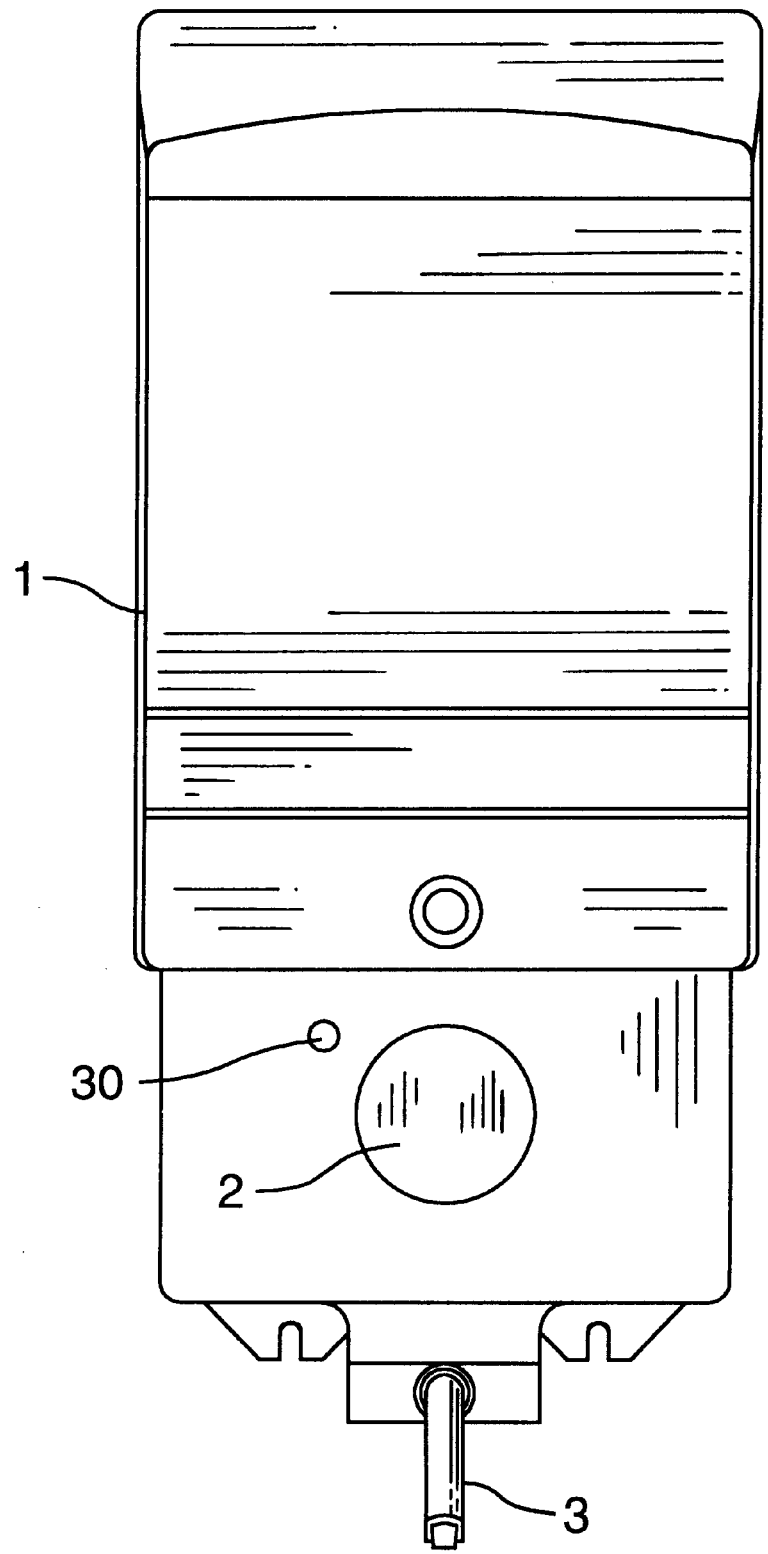
FIG. 1 is a front view of a dispenser.
Figure 2:
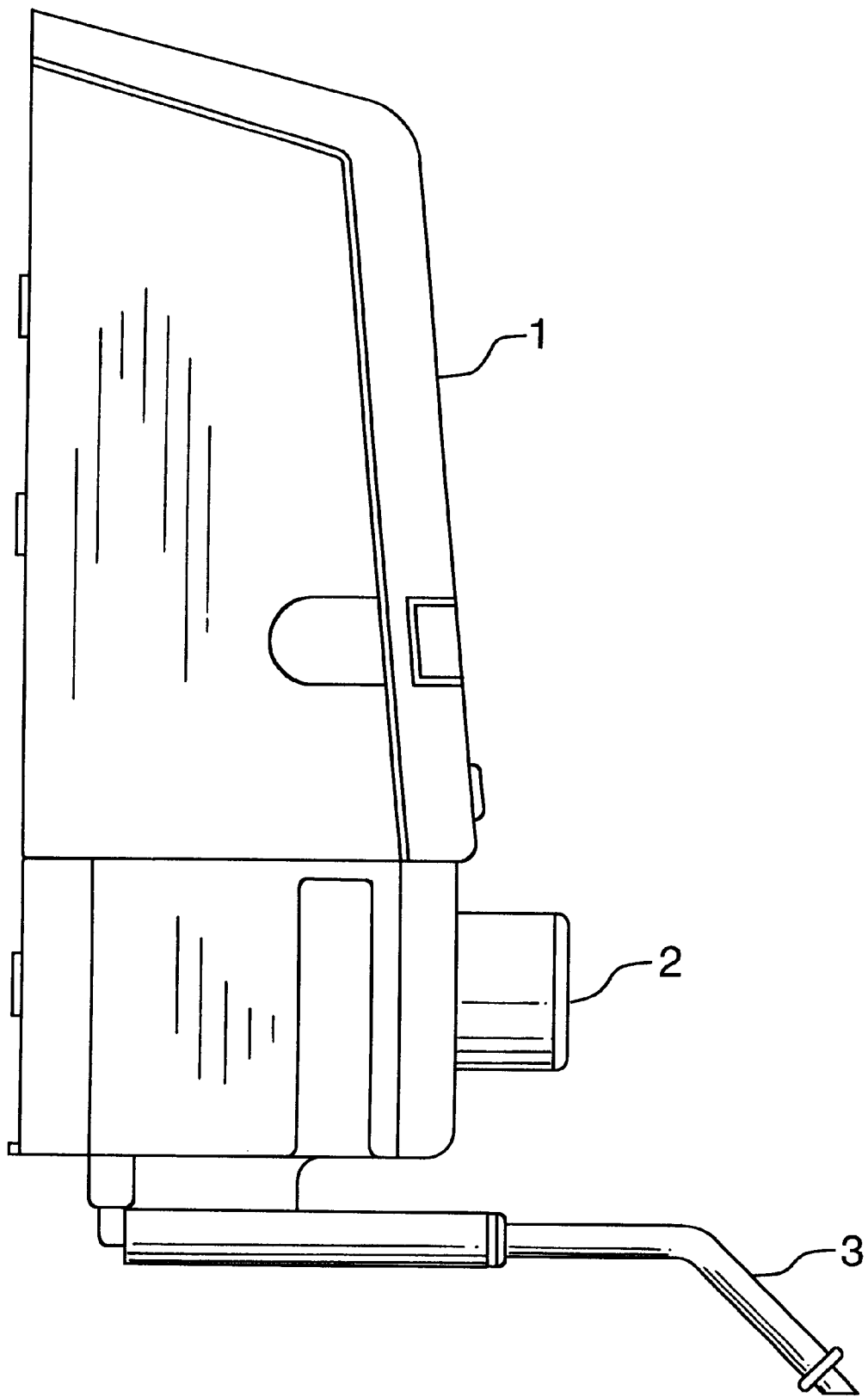
FIG. 2 is a side view of the dispenser of FIG. 1.

The dispenser shown in FIGS. 1 and 2 would be wall mounted in a conventional fashion. The dispenser casing 1 includes a plunger 2 which is depressed by the user to dispense a shot of liquid through pipe 3. This pipe would be arranged over a sink, for example in which washing-up may be done in an industrial kitchen.

Inside the dispenser is arranged a reservoir or container of detergent. The container may be replaceable and may include a rubber septum in its cap which, upon mounting of the container in the dispenser, is pierced by a hollow peg through which the liquid is then drawn. This arrangement is described in Unilever N.V.'s European Patent 0369722 and so is not described further in the present application. Of course, other methods of drawing the liquid out of the reservoir are possible and the invention is not intended to be limited to the particular system shown in this earlier patent.

Figure 3:
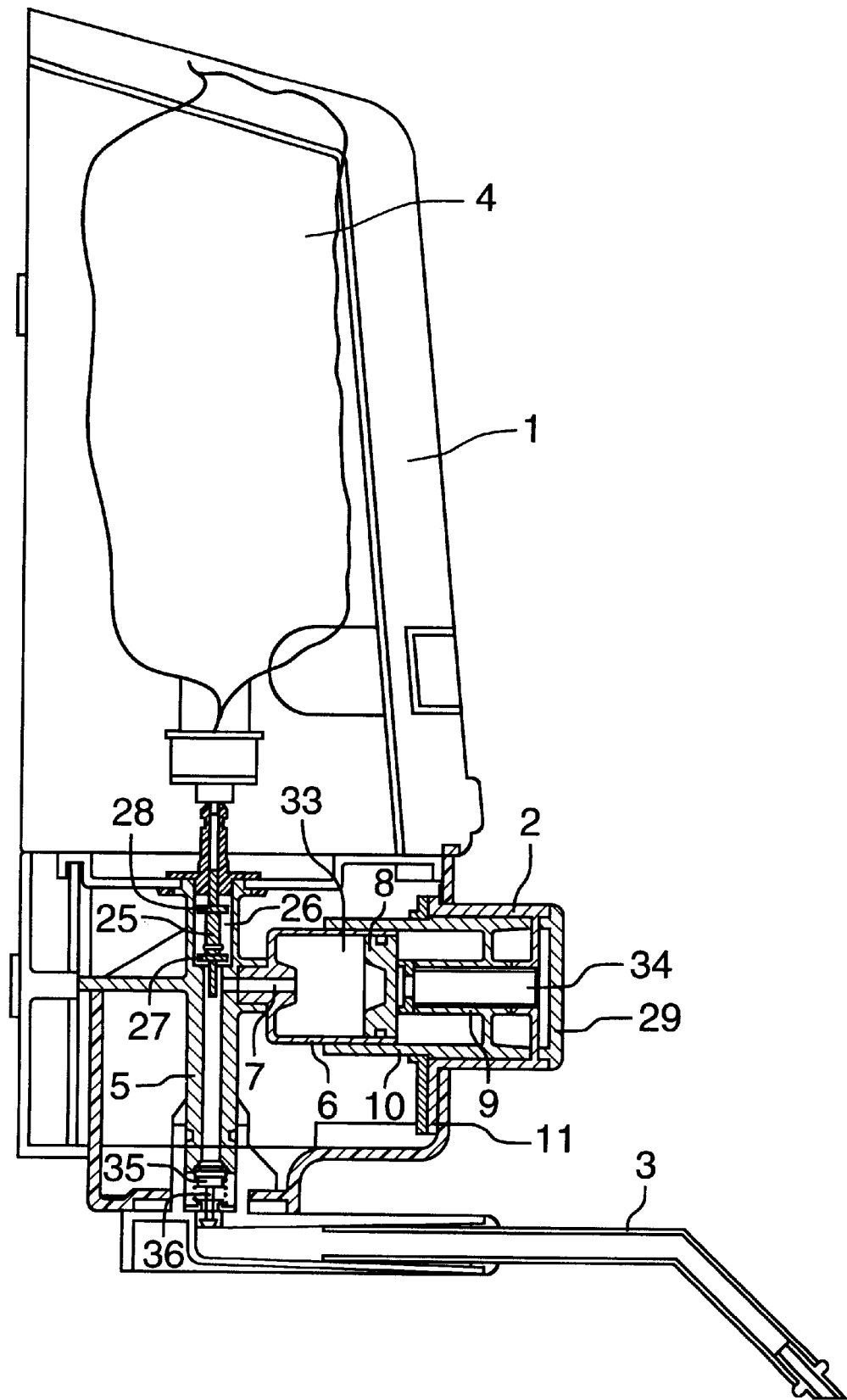
FIG. 3 is a vertical sectional view of the dispenser of FIGS. 1 and 2.

As shown in the sectional view of FIG. 3, reservoir 4 is arranged within the dispenser casing 1 and line 5 is arranged between the reservoir and the outlet pipe 3. In a generally conventional fashion, a pump comprising a piston cylinder 6 is connected in the line 5, the inlet/outlet 7 of the piston cylinder 6 being in liquid communication with the line 5 between the reservoir 4 and the outlet pipe 3. The line 5 is the common inlet and outlet for the piston cylinder 6. Piston 8 is slidably arranged and reciprocal within the piston cylinder 6 and includes a hollow piston stem 9 and an interconnected sleeve 10 which slidably surrounds the piston cylinder 6. On the outer end of the sleeve 10 is arranged the plunger 2. The sleeve 10, with interconnected stem 9, and plunger 2 are slidable relative to one another and the plunger 2 is kept from moving out of the dispenser by means of an inner flange 11.

Figure 4A:
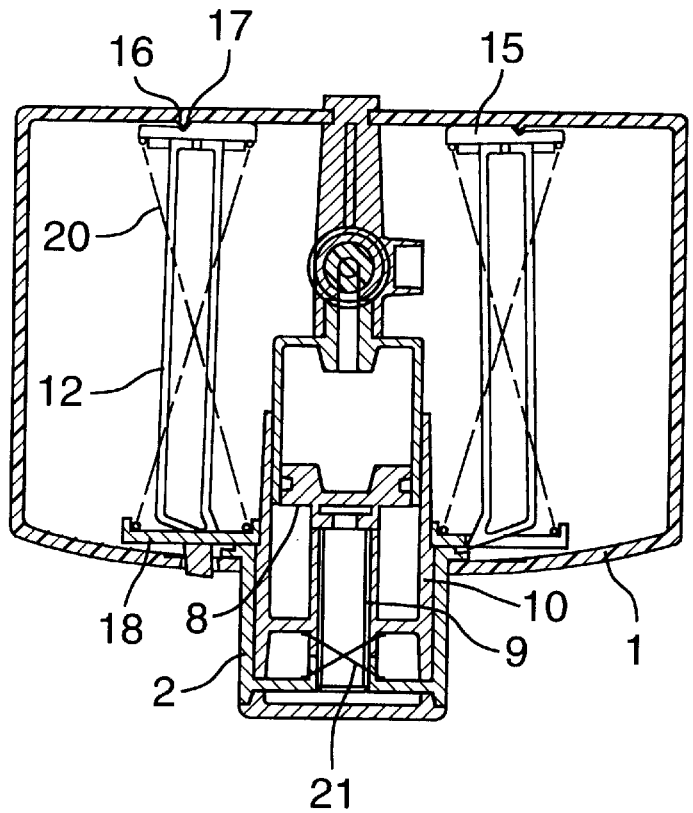
FIGS. 4A, 4B and 4C are horizontal sectional views of the lower part of the dispenser of FIGS. 1 and 2, showing the piston assembly in different stages of actuation.

As shown in FIGS. 4A, B and C, at either side of the piston sleeve 10 are rocking arms or flexible arms 12. These arms 12 can pivot or flex through a small angle so that their forward inner nose portions 13 can be moved from a position clear of the ends of the flange 11 of the plunger 2 to a position inward of that flange and thereby function as a detent. As seen more clearly in FIG. 4C, the flange 11 is formed with a slight indent 14 on which the inclined nose portions 13 of the rocking arms 12 can engage. In accordance with a preferred embodiment, the pivoting of the rocking arms may be believed by means of their base portions 15 which are formed with an indent 16. The indent 16 engages on a ridge 17 at the rear of the dispenser casing 1, the arms 12 thus being able to rock on the ridges 17.

Figure 5:
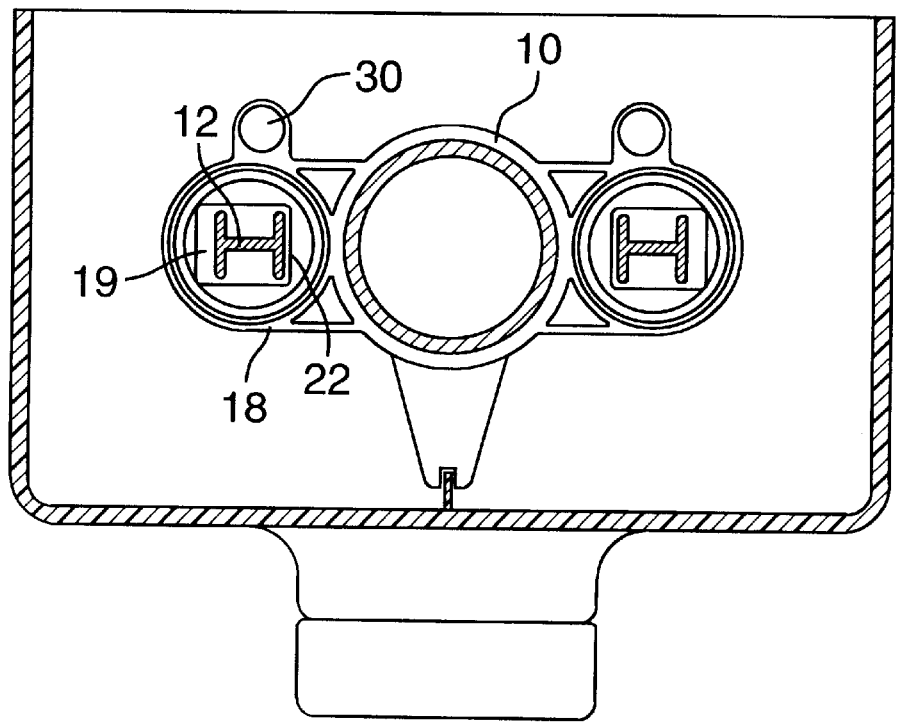
FIG. 5 is a vertical sectional view of the lower part of the dispenser, at 90° to the view of FIG. 3, again showing the piston assembly.

As most clearly seen in FIG. 5, on either side of the sleeve 10 of the piston is arranged an element in the form of a wing 18 with an aperture 19. Between the wings 18 and the base portions 15 of the rocking arms 12 are arranged a biasing means such as springs 20 (FIG. 4A) which act to push the piston 8 out of the piston cylinder 6, so as to draw in a shot of liquid. Between the forward end of the piston stem 9 and the plunger 2 is arranged another spring 21 which acts to bias or urge the plunger 2 away from the piston. This spring 21 is, however, weaker than the other springs 20 so that, looking at FIG. 4A, the spring 21 is not able to push the piston 8 into piston cylinder 6. It will be understood that the springs 20 also act to urge or bias the rocking arms 12 inwardly, by means of their action on the base portions 15, so that the arms 12 tend to move to the position in which they engage the flange 11 of the plunger 2.

The apertures 19 of the wings 18 of the piston sleeve 10 allow for lateral movement of the wings along the length of the rocking arms 12, as the piston is depressed. At the inner side of each aperture 19 there is an edge 22, so arranged relative to the rocking arm that it will abut the inclined nose portion 13 of the rocking arm when the piston is in the outer position (as in FIG. 4A). The edge 22 thus acts to move the nose portion 13 of the rocking arm into the position in which it is just free or clear of the flange 11 of the plunger 2, it being understood that the flange 11 does not extend further outwardly than the edge 22 of the wing 18.

Figure 4B:
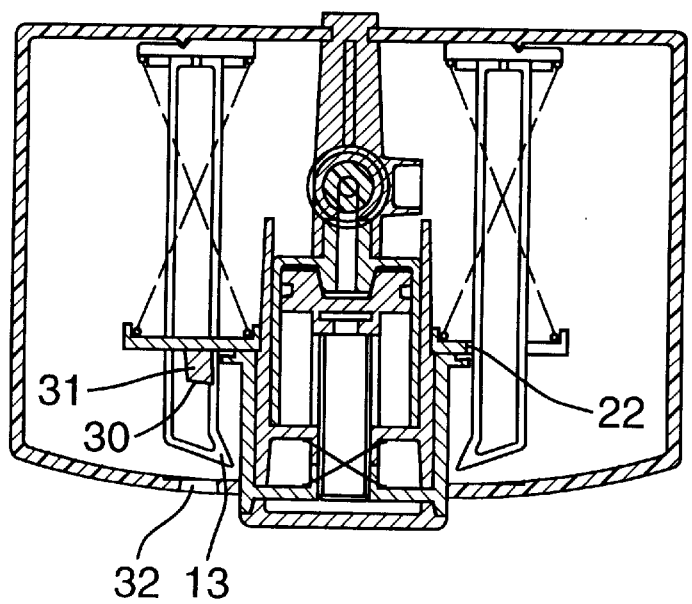

The operation of the dispenser is thus as follows. FIG. 4A shows the dispenser in its "ready-to-dose" condition. To dispense a shot of liquid, the user depresses the plunger 2 which, as it emerges, the stem 9 and sleeve 10 immediately has the effect of pushing the piston 8 into the piston cylinder 6. The fully depressed position of the plunger 2 and piston 8 is shown in FIG. 4B. With the piston depressed, a volume of liquid equal to the swept volume of the piston cylinder 6 is ejected through the pipe 3.

Upon the user releasing the plunger 2, the spring 21 between the piston and the plunger will urge the plunger back into its outer position, because it slowly moves outwardly as it draws viscous liquid into its cylinder chamber. The piston 8 cannot, however, immediately resume its outer position. This temporary condition of the dispenser is shown in FIG. 4C.

It will be appreciated that as the plunger 2 and piston 8 are initially is pushed in, the nose portion 13 of each rocking arm 12 moves over the edge 22 of the wing 18 and over the edge of the flange 11 of the plunger and assumes its inward position, as shown in FIG. 4B. With the plunger 2 being moved to its outer position, as shown in FIG. 4C, the flange 11 of the plunger moves along the inclined surface of the nose portion 13, moving the rocker arms outwardly, before the flange "clicks" over the nose portion. Each nose portion 13 now engages in the indent 14 on the flange portion 11, thus preventing the plunger 2 from being depressed. Hence the nose portion 13, as it clicks behind flange 11, functions as a detent lever or arm.

Figure 4C:
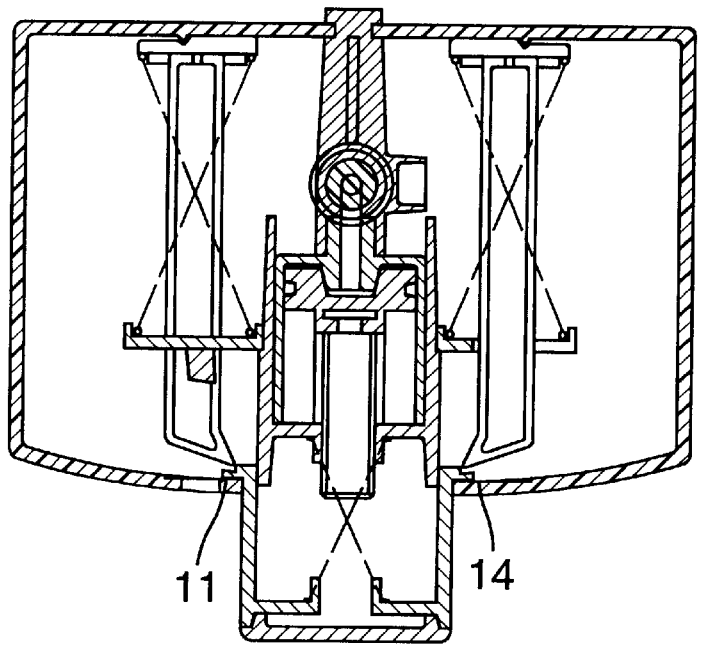

When the user removes pressure from the plunger 2 and the plunger has sprung to its outermost position of FIG. 4C, the springs 20 begin to act to move the piston 8 back to its outer position. This feature provides a built-in extended delay between dispensed shots. The length of time which is taken for the piston to resume its outer position is dependent upon a number of factors, including the strength of the springs 20, the viscosity of the liquid in the reservoir and the shot size selected. Furthermore, to deliberately increase the delay or recharge time it is often advisable to include a slow release or "leak" member valve 25 in the line 5 to impede liquid flow between the piston cylinder 6 and the reservoir 4 so as to avoid the dispenser being ready to dose too quickly (which might encourage the user to use an excessive number of doses).

As shown in FIG. 3, valve member 25 is arranged in a chamber 26 immediately between the inlet/outlet 7 of the piston cylinder 6 and the outlet of the reservoir 4. The valve member 25 is generally cylindrical with two flanges 27, 28. The diameter of the cylinder on either of its ends, on the outside of the flanges, is different. One of the ends of the valve 25 engages loosely in the outlet from the reservoir 4, restricting the flow path. This acts to decrease the flow of liquid from the reservoir and thus slow down the filling of the cavity 33 of piston cylinder 6. If it is desired to fill the piston cylinder cavity more quickly, the opposite end of the valve member 25 can be inserted in the outlet, this end being of narrower diameter and so allowing a greater flow. The dispenser is designed so that the chamber 26 can easily be accessed from above to reverse the position of the valve member 25 or even to change it for a different valve member. The valve member 25 also, of course, functions as a check valve to prevent liquid flow up into the reservoir when the pump is actuated. Similarly, check valve 35 functions to prevent liquid from being drawn out of pipe 3 when the cylinder cavity 33 is being filled by springs 20 moving the pistol back. This ensures that each shot is properly dispensed and liquid is not lost to a void in the pipe 3. Also check valve 35 has a spring 36 which maintains valve 35 closed against the head pressure in reservoir 4. The pressure from the pump piston 8 overcomes, however, the spring pressure in valve 35 to permit dispensing of each shot.

After a period of time, for example 30 seconds or 1 minute, the piston 8 has been forced back to its original position, shown in FIG. 4A. As previously mentioned, here the edge 22 of the wing 18 of the piston has moved the nose portion 13 of each rocking arm 12 into its outer position, free or clear of the flange 11 of the plunger 2. The plunger 2 can now be depressed again.

It is apparent that, until the piston cylinder 6 is full or at least until the piston has retreated sufficiently to release flange 11, the plunger cannot be depressed, thus preventing a user from dispensing partial shots of liquid. Furthermore, the delay in the plunger being able to be depressed at all will deter a user from trying to dispense unnecessary, complete shots.

The plunger 2 may be formed with a cap 29 which can be removed to allow access to an adjusting screw 34 in the center of the piston stem 9 which allows for adjustment of the volume of the piston cylinder 6. Thus, turning of the adjusting screw will move the piston member 8 relative to the stem 9 to adjust the extent of piston movement by the plunger and, in turn, adjust the volume of the piston cylinder cavity 31 and thus the size of the shot. By turning the screw forwardly, the extent of piston movement is decreased and hence so is the shot volume.

Another feature of the dispenser is the provision of an indicator 30 which shows to the user when the dispenser is ready to dose. The indicator is seen in the front view of FIG. 1. The indicator takes the form of a colored forward section of a lug 31 which is arranged on one of the wings 12 of the piston. This lug is clearly seen in FIG. 4B. In FIG. 4A, the lug is at its most forward position so that the colored section is arranged in a recess 32 in the front of the casing 1 and so is visible to the user. Because the lug is mounted on the piston and not the plunger, the colored section is only visible when the piston is at the forward position with the piston cylinder full of liquid and ready to use. Typically, the color used would be green, to indicate that the user can go ahead with dispensing.

Although preferred embodiments of the invention have been described herein in detail, it will be understood by those skilled in the art that variations may be made thereto without departing from the spirit of the invention or the scope of the appended claims.

We claim:

1. A manually operated dispenser for dispensing single shots of liquid with a built-in extended delay between each manually dispensed shot, the dispenser comprising:

(i) a reservoir of liquid which may be dispensed in single shot amounts;

(ii) a manually operated pump for withdrawing a single shot of liquid from the reservoir of liquid, the pump comprising an outlet through which the single shot is dispensed and a reciprocal piston and cylinder assembly for relative movement;

(iii) a plunger for manually positioning the piston in an extended position to dispense the single shot from the cylinder into the outlet, the plunger being movable away from the piston and cylinder assembly to an outwardly ready-to-dispense position and a means for biasing the plunger to the outward position, the means being weaker than a biasing means for the piston;

(iv) locking means for locking the plunger in an outward position, the locking means comprising a detent lever biased to a locking position for the plunger and the piston having an element which disengages the detent when the piston is positioned in a retracted position; and (v) biasing means for biasing the piston in the retracted position relative to the cylinder whereby the relative movement of the piston to the retracted position disengages the locking means, the relative movement of the piston from the extended position to the retracted position defining a built-in extended delay between the single shot amounts.

2. A dispenser of claim 1 wherein means are provided for impeding flow of liquid from said reservoir into said cylinder to define the extended delay.

3. A dispenser of claim 1 wherein relative movement of said piston and cylinder to said piston retracted position moves an element into contact with said locking means to disengage said locking means.

4. A dispenser of claim 1 wherein means are provided for the adjusting extent said plunger actuates relative movement between piston and cylinder that determines the volume of liquid shot dispensed.

5. A dispenser of claim 1, wherein said cylinder has a common inlet and outlet, a check valve being provided upstream and downstream of said pump to ensure liquid flow into said pump through said common inlet from said reservoir when said piston is positioned in said retracted position and to ensure liquid flow out of said common outlet when said piston is positioned in said extended position.

6. A dispenser of claim 5 wherein said check valve below said pump is capable of holding back liquid in said reservoir when said piston is positioned in said retracted position.

* * * * *